UNITED STATES PATENT OFFICE.

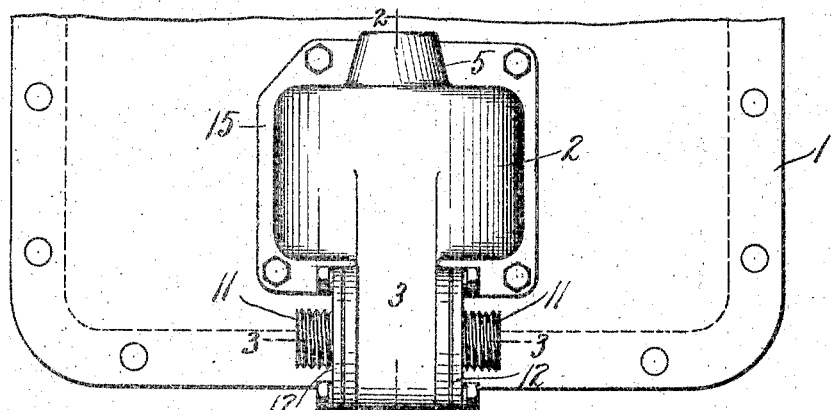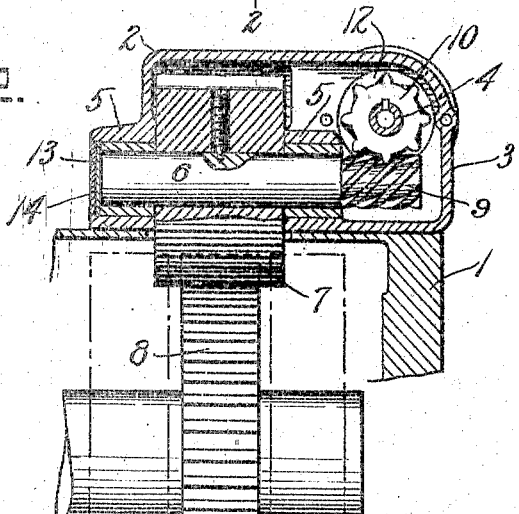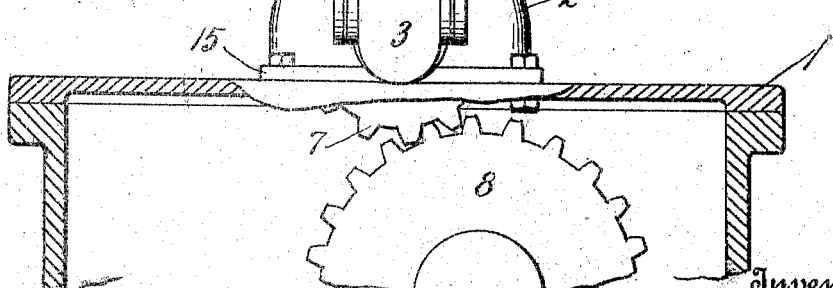

THEODORE DOUGLAS, OF SCARBORO, NEW YORK, ASSIGNOR TO DUPLEX ENGINE GOVERNOR COMPANY, INC., OF BROOKLYN, NEW YORK, A CORPORATION OF NEW YORK.

TRANSMISSION MECHANISM.

1,334,486.

Specification of Letters Patent. Patented Mar. 23, 1920.

Application filed June 26, 1918. Serial No. 242,113.

*To all whom it may concern:*

Be it known that I, THEODORE DOUGLAS, a citizen of the United States, residing in Scarboro, in the county of Westchester and State of New York, have invented certain new and useful Improvements in Transmission Mechanism, of which the following is a specification.

My invention relates to an improved transmission mechanism; particularly a transmission mechanism for use upon motor vehicles.

The principal object of my invention is to provide a transmission mechanism which is simple in construction and composed of relatively few parts; and which is designed to be quickly mounted in operative position by being applied to the casing that incloses the change speed gearing of the vehicle; and be actuated by one of the members by said gearing without interfering with the proper function of the latter.

Another object of my invention is to devise a transmission mechanism by which motion can be imparted to a plurality of the accessories of the vehicle or the engine driving it; for example the governor that regulates the engine, and the speedometer that indicates the rate of travel of the vehicle.

In the following description and by reference to the drawings I set forth a preferred form or embodiment of my invention; but I of course may make alterations in what is actually shown herein, consistent with the scope of the appended claims.

Figure 1 is a top plan of a housing in which the operating elements of my improved transmission mechanism are disposed, the same being mounted on the casing of the change-speed gearing of a motor vehicle.

Fig. 2 is a longitudinal section, taken on the line 2—2, in Fig. 1, and

Fig. 3 is a transverse section taken on the line 3—3 of Fig. 1.

The same numerals identify the same parts throughout.

In the particular description of the drawings, I employ the numeral 1 to indicate part of a casing in which the usual change speed gearing of an automobile or motor truck is located; and to this casing I affix a housing 2 which forms part of my transmission mechanism and incloses the operating elements of the same. This housing 2 can be made as a single casting and it includes an extension 3 which carries bearings for a transmission element or shaft 4, which projects from both sides of the extension 3.

The housing 2 is also provided with a pair of bearings 5 in line with the extension 3 for a shaft 6 carrying a broad faced gear 7. One of these bearings 5 is inside the housing, and the other one is supported by a wall of the same on the side opposite the extension 3; and may be carried in projecting position. The space between these two bearings is about the same as the thickness of the gear 7 and as this gear 7 is fixed to the shaft 6 in any suitable way, axial movement or end play of this shaft is prevented.

The housing 2 has an aperture in the bottom, through which the gear 7 can project to the outside of the same; and when this housing is secured to the casing 1 the aperture mentioned will register with a similar aperture in the casing; whereby the gear 7 may project into the casing 1, and there mesh with a gear 8, which acts as a driving member. This gear 8, being located inside the casing 1, forms part of the change speed gearing above mentioned. I do not wish to be limited to any particular one of the gears in the casing 1; but the gear 7 should preferably mesh with a gear that is driven at some speed that is fixed with reference to the rate of the travel of the vehicle; for example, the gear 8 will be one of the gears for shifting from one ratio to another, mounted on the propeller shaft extending from the casing 1 to the rear or drive wheels of the vehicle, which of course, need not be shown. Hence, as illustrated by the broken lines in Fig. 2, the gear 8 is made capable of axial movement or adjustment for the purpose of assuming different predetermined positions in the casing by sliding this gear in one direction or the other on its supporting shaft in the casing 1.

The shaft 6 projects through the bearing 5 inside the housing 1 into the extension 3 below the shaft 4. On its end adjacent this shaft 4 it carries spiral teeth 9 which mesh with a spiral gear 10 keyed to the shaft 4. As shown in Fig. 3, the shaft 4 is mounted in alined bearings 11 and the sides of the extension are open but can be furnished with closing means in the shape of suitable glands 12 having central bores into which the bearing members 11 are received. The means 12 thus serve also to support the bearings 11. These glands may project into the extension 3 far enough to confine the gear 10 against the axial movement or side play; and the bearings 11 may be in the shape of bushings having their outer ends threaded to receive nuts or the like if desired. The opposite ends of the shaft 4 are adapted for connection with the devices to be driven by this shaft, such as the speedometer of the vehicle and the governor of the engine for propelling the vehicle. For the purpose mentioned these ends may be provided with recesses, which may be round, with a key way, or polygonal in cross-section; so that the ends of the shafts of the governor and the speedometer can be thrust into them.

From the above description it will be apparent that my transmission mechanism is very simple in its construction and satisfactory in its utilization. Once the housing 2 is mounted on the casing 1, with the gear 7 in mesh with the gear 8, the element 4 will be turned, no matter what position the gear 8 may assume, because the gears 7 and 8 will maintain their operative connection or relation for all relative positions of these gears; even when the gear 8 is moved as far to the left as it will go, it will still drive the gear 7 through the engagement of the ends of its teeth with the ends of the teeth of the gear 7; and it will operate the gear 7 in the same way when moved over to the right. As little power is required to rotate the gear 7, the engagement of the teeth of the gears 7 and 8 over the entire length of the same is not essential.

The bearing 5 carried by the wall of the housing 2 as shown in Fig. 2, may be open; but the adjacent end of the shaft 6 will preferably be within this bearing. Both the bearings 5 will be lined with suitable jackets or bushings to take up wear; and the bearing 5 in the outer wall of the housing 2 will carry a suitable packing disk 13 which fits against the end of the shaft 6 and the bushing or jacket therein. Over this packing disk 13 may be placed a plate or disk 14 to close up this bearing. In order to secure the housing 2 to the gear case 1 the housing may have a flange 15 at the bottom to enable it to be bolted in place on the gear casing.

The driving member 8 and the transmission mechanism thus preserve their operative relation or connection for all positions of the gears 8, and the necessary functions of the change speed gear in the case 1 are subjected to no hindrance, interference, or modification whatever. Through the means for imparting motion from the shaft 6 to the shaft 4, such as the spiral teeth 9 and gear 10, the gear 7 works most efficiently, and though I have stated that the devices to be operated by my transmission mechanism are the governor or speedometer, I of course wish to be understood that other devices may be connected to the shaft 4 instead, if circumstances should so require.

Having described my invention what I believe to be new and desire to secure and protect by Letters Patent of the United States is:

1. A driving member capable of assuming predetermined positions and transmission mechanism to be actuated thereby, said mechanism; and said member preserving operative relation in all positions of said member, said mechanism including an element for imparting motion to a plurality of devices to be operated through said mechanism.

2. A driving member capable of assuming predetermined positions, a casing therefor; and transmission mechanism mounted on said casing, said member and said mechanism preserving operative relation in all positions of said member, said mechanism including an element for imparting motion to a plurality of devices to be operated through said mechanism.

3. A rotatable gear capable of axial movement to predetermined positions and a gear to be actuated thereby, said gears maintaining operative connection in all relative positions of the same, the axial movement of the rotatable gear being substantially parallel to the axis of the other of said gears.

4. A rotatable gear capable of axial adjustment to predetermined positions, a gear to be actuated thereby, said gears maintaining operative relation in all relative positions of the same, and an element to be driven by the second named gear, said element imparting motion to a plurality of devices to be operated through said element.

5. A casing, a rotatable gear capable of axial adjustment to predetermined positions therein and a gear to be actuated by said rotatable gear, said gears maintaining operative relation in all relative positions of said gears, the axial movement of the rotatable gear being substantially parallel to the axis of the other of said gears.

6. A casing, a rotatable gear capable of axial adjustment to predetermined positions therein, a gear to be actuated by said rotatable gear, said gears maintaining operative relation in all relative positions of said gears, and an element connected to the second named gear and adapted to impart motion to a plurality of devices to be operated through said element.

7. A casing, a gear capable of axial adjustment to predetermined positions therein, a housing secured to the casing, a broad-faced gear in the housing to mesh with the rotatable gear in all positions of the latter, a shaft carried by the housing projecting therefrom, said shaft having both ends adapted for connection with devices to be operated, and means for imparting motion to said shaft from said broad-faced gear.

8. A housing for transmission mechanism, said housing comprising a pair of bearings, and having an extension in line with said bearings, and means associated with said extension for supporting a pair of bearings transversely of the first-named bearings.

9. A housing for transmission mechanism including a pair of bearings, one of said bearings being located inside of said housing, said housing having an extension in line with said bearings, and means carried by the extension for supporting a pair of bearings transversely of the first-named bearings.

10. A casing, a rotatable gear capable of axial adjustment to predetermined positions in said casing, a housing secured to the casing, said housing having a pair of bearings, one of which is inside the housing, a shaft in said bearings carrying a gear inside of said housing, said housing and said casing having registering apertures through which said gear may project to be engaged by the rotatable gear, said gears maintaining engagement in all relative positions of same, the housing having an extension in line with the bearings, means for closing the sides of said extension, bearing members carried by said means, a shaft mounted in said bearing members and projecting at both sides of the extension, said shaft having its ends adapted for connection with devices to be operated through said element, and means in said housing for imparting motion from the shaft carrying the gear to the shaft mounted in the extension.

In testimony whereof, I have signed my name to this specification this 14th day of June 1918.

THEODORE DOUGLAS.